Figure 1:
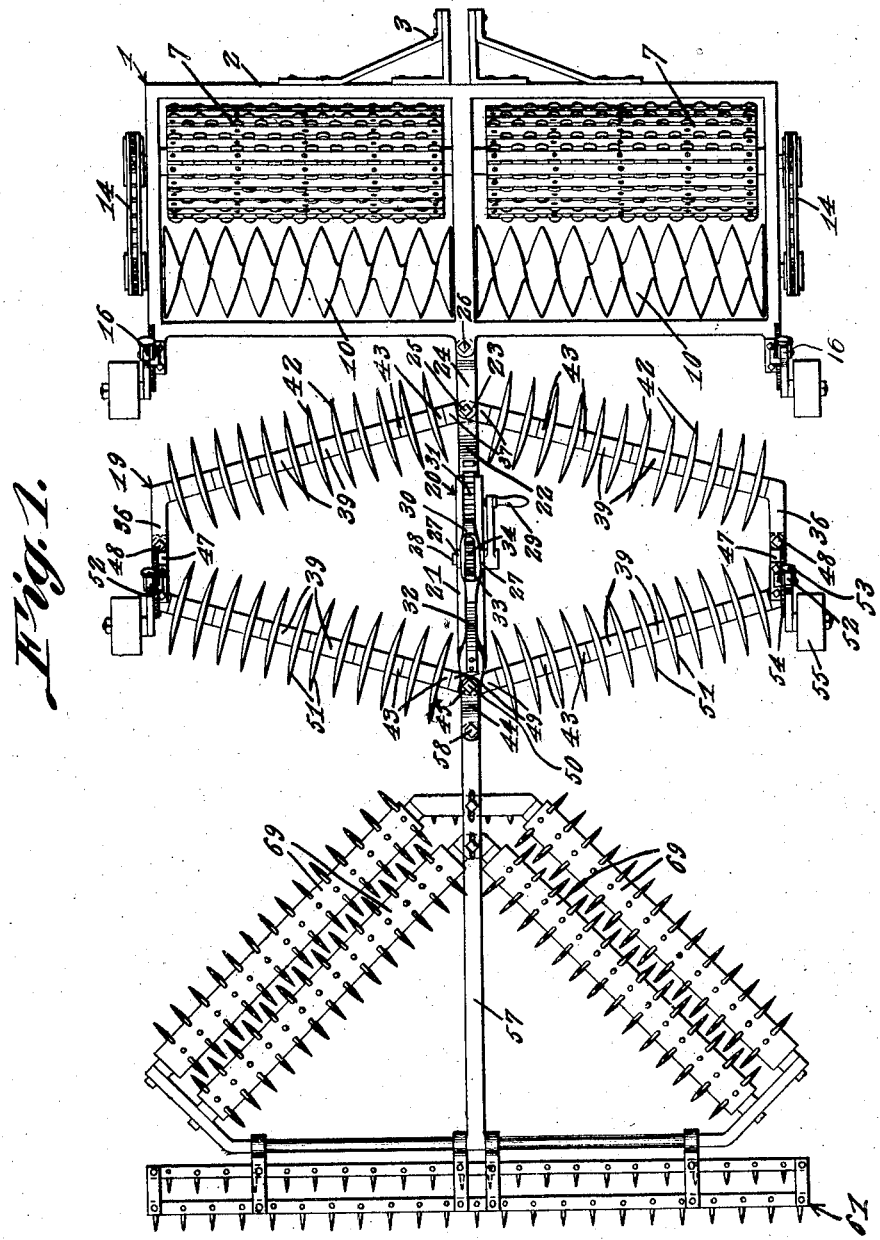

Dec. 21, 1926.                                               1,611,358
                         A. E. MILLER
                       CULTIVATOR FRAME
               Filed May 9, 1922            2 Sheets-Sheet 1

A. E. Miller, Inventor

By C. A. Snow & Co.
                    Attorney

Dec. 21, 1926.  1,611,358
A. E. MILLER
CULTIVATOR FRAME
Filed May 9, 1922   2 Sheets-Sheet 2
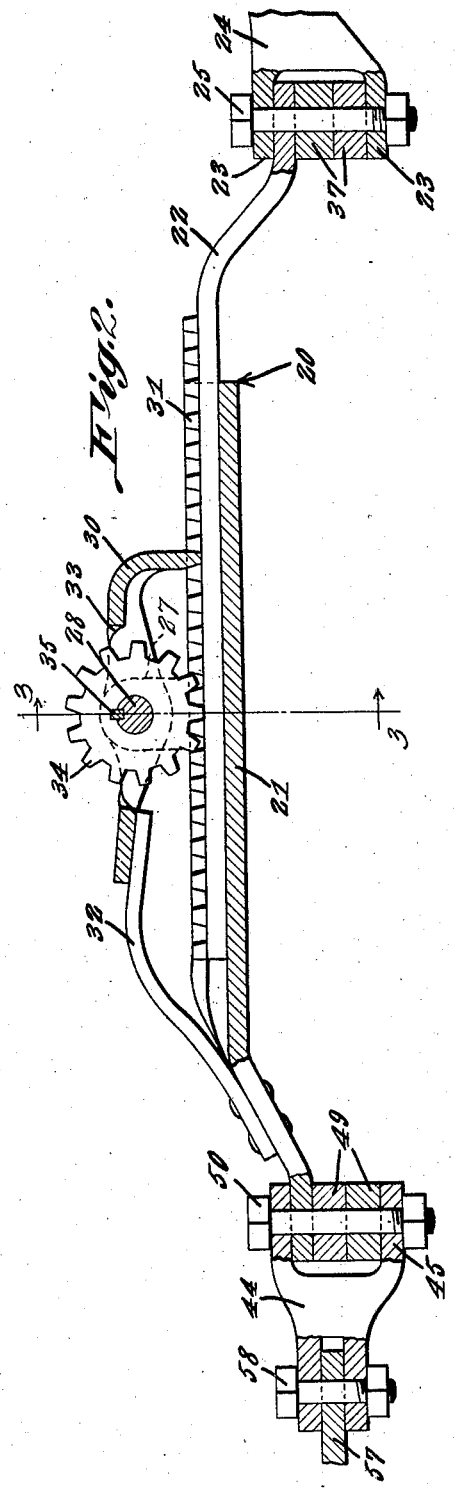
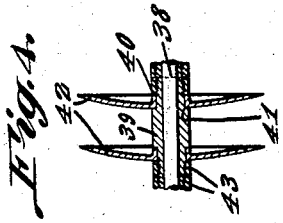
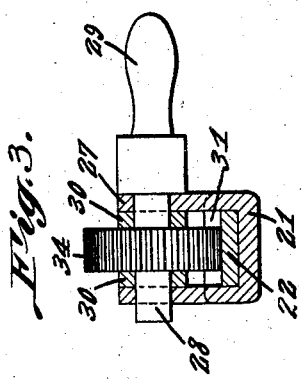
A.E.Miller, Inventor Patented Dec. 21, 1926.

1,611,358

UNITED STATES PATENT OFFICE.

AUSTIN E. MILLER, OF CHENEY, WASHINGTON.

CULTIVATOR FRAME.

Application filed May 9, 1922. Serial No. 559,536.

This invention aims to provide novel means for expanding and contracting the frame of a cultivator.

Figure 1 shows in top plan, a device constructed in accordance with the invention; Figure 2 is a fragmental longitudinal section taken through the intermediate member of the device; Figure 3 is a section on the line 3—3 of Figure 2; Figure 4 is a sectional view showing the means whereby the cultivating disks are mounted.

The device shown embodies a forward member 1 including a frame 2 carrying draft means 3. Spiral cutters 10 are journaled on the frame 2, and are connected by driving means 14 with rollers 7 which are journaled on the frame 2. The rear end of the frame 2 may be raised and lowered by any suitable means as shown at 16.

The invention is embodied in an intermediate member 19, comprising a longitudinal extensible beam 20. The beam 20 includes a channel-shaped rear bar 21, and a forward bar 22 mounted for longitudinal adjustment in the bar 21. The forward end of the bar 22 may be received within a fork 23 formed on the rear end of a link 24, a pivot element 25 passing through the fork and through the forward end of the bar 22. A pivot element 26 connects the forward end of the link 24 with the frame 2 of the forward member 1 of the implement. The rear bar 21 is supplied with upstanding ears 27 wherein a shaft 28 is journaled, the shaft being operated by a crank 29. A pawl 30 is disposed between the ears 27 and is pivotally mounted intermediate its ends, on the shaft 28. The rear end of a spring 32 is attached to the bar 21. The forward end of the spring 32 engages beneath the rear end of the pawl 30 and causes the forward end of the pawl to interlock with a rack 31 fashioned on the forward bar 22. The pawl 30 has an opening 33, through which extends a pinion 34, adapted to cooperate with the rack 31, the pinion being secured at 35 to the shaft 28.

End members 36 are supplied, the same extending longitudinally of the draft line. Supports 37 are shown, the supports being located within the fork 23 of the link 24, the pivot element 25 passing through the supports. The inner ends of shafts 38 are mounted in the supports 37, the outer ends of the shafts being mounted in the end members 36. Cultivator disks 42 are supported for rotation on the shafts 38 in any desired way. If preferred, sleeves 39 may be journaled on the shaft 38, the sleeves having reduced ends 40 defining shoulders 41, the cultivator disks 42 being mounted on the ends 40 of the sleeves 39 and being held in engagement with the shoulders 41 through the instrumentality of collars or nuts 43 threaded on the reduced ends 40 of the sleeves 39.

The numeral 44 marks a link having a forward fork 45. End members 47 are shown and extend longitudinally of the draft line, the end members 47 being pivoted at 48 to the end members 36. Supports 49 are located within the forward fork 45 of the link 44. A pivot element 50 passes through the fork 45 and through the supports 49, as well as through the rear end of the bar 21 of the longitudinally extensible beam 20. Cultivator disks 51 are located to the rear of the cultivator disks 42. The disks 51 are mounted on a shaft, carried by the end members 47 and the supports 49, after the manner of the shaft 38, hereinbefore described. The intermediate member 19 may be raised and lowered with respect to the ground by any effective means indicated at 52.

The implement includes a rear member embodying a draw bar 57 extended within the rear part of the link 44 and connected thereto by a pivot element 58. The draw bar 57 carries a drag 61 and rollers 69.

Passing to the operation of the intermediate member 19, it will be clear that, by way of the crank 29, or its equivalent, rotation may be imparted to the shaft 28, the pinion 34 being rotated, and the pinion cooperating with the rack 31 of the forward bar 22 of the longitudinally extensible beam 20, thereby to vary the length of the beam.

The beam may be held at any adjusted length by engaging the pawl 30 with the rack 31 on the bar 22. When the operation above described is carried out, the effective width of the intermediate member 19 may be varied, and the angle of the disks 42 and 51 with respect to the draft line may be changed.

After the weeds have been cut, through the instrumentality of the members 10, the disks 42 and 51 serve to operate on the soil in a way which will be understood readily by those skilled in the art. Then the soil is operated on by the rollers 69, and finally, the soil is spread and reduced by the drag 61.

What is claimed is:—

An implement of the class described, including forks spaced apart lengthwise of the draft-line, pivot elements carried by the forks, lateral frames comprising members which are pivotally united at their outer ends, the inner ends of said members being received within the forks and being mounted on the pivot elements, soil-engaging elements on said members of the frames; and a longitudinally extensible brace embodying bars having their outer ends mounted on the pivot elements and located within the forks, one bar being supplied at its inner end with a channel wherein the inner end of the other bar is slidably received, the inner end of said slidable bar being provided with a rack meshing with a pinion secured to a shaft that is journaled in upstanding ears on the side flanges of the channel, a pawl pivotally mounted intermediate its ends on the shaft and located between the ears, the pawl being provided with an opening through which the pinion extends, means for rotating the shaft, and spring means carried by the first-specified bar and engaging with one end of the pawl to cause the other end of the pawl to engage with the rack of said other bar.

In testimony that I claim the foregoing as my own, I have hereto affixed my signature.

AUSTIN E. MILLER.